United States Patent Office 3,431,338
Patented Mar. 4, 1969

3,431,338
COATED DOSAGE FORM ADAPTED TO ORAL EMETINE OR DEHYDROEMETINE THERAPY
Kurt Munzel, Riehen, Switzerland, assignor to Hoffmann-La Roche Inc., Nutley, N.J., a corporation of New Jersey
No Drawing. Continuation-in-part of application Ser. No. 394,061, Sept. 2, 1964. This application Feb. 29, 1968, Ser. No. 709,179
Claims priority, application Switzerland, Sept. 10, 1963, 11,155/63
U.S. Cl. 424—21                                12 Claims
Int. Cl. A61k 27/00

ABSTRACT OF THE DISCLOSURE

Pharmaceutical compositions are described comprising (1) a medicament-containing nucleus coated, sequentially, with (2) a layer of an acid-soluble coating material which is resistant both to alkalis and intestinal juices, (3) a water-soluble intermediate layer, and (4) a layer of an alkali-soluble coating material which is resistant to acid and gastric juices.

The compositions are characterized in that the active medicament is released in the lower sections of the small intestine and the colon.

A process for treating intestinal infections, using certain of the described compositions, is also disclosed.

CROSS-REFERENCE TO RELATED APPLICATIONS

This application is a continuation-in-part of my U.S. patent application Ser. No. 394,061, filed Sept. 2, 1964, now abandoned.

BACKGROUND OF THE INVENTION

In certain instances, it is undesirable for a medicament to be released in the stomach from the dosage form in which it is embodied. This is true, for example, where the medicament is decomposed in the stomach by the hydrochloric acid and/or the enzymes of the gastric juices. This is true also, where the particular medicament in use irritates the gastric mucosa. To avoid premature release of the drug, it has been the practice to coat the granulate, tablet, gelatin capsule, dragee, etc. containing the drug with a material which is neither attacked, dissolved nor digested by the gastric juices. One type of coating which is suitable for such use is a lacquer substance which resists the action of the gastric acid, i.e., hydrochloric acid. Coatings of this nature are not, however, normally resistant to the alkaline digestion juices of the duodenum and of the upper sections of the small intestine and, as a result, the coated composition is dissolved or decomposed prematurely, with the ensuing liberation of the medicament.

It is known also that pharmaceutical preparations can be coated with waxes and fats and that the coated compositions, thus obtained, will be resistant to attack by the gastric acid. However, fat and wax coated products are decomposed by the alkali in the intestinal juice only at relatively slow rates and, at times, not completely, unless decomposition is facilitated by the action of the intestinal and pancreatic enzymes, particularly lipase, and the wetting and emulsifying action of the bile.

None of the measures described in the foregoing paragraphs are capable of preventing the liberation of the active medicament in the duodenum and the upper sections of the small intestine and at the same time, permitting the medicament to be released only when the pharmaceutical composition has reached the lower sections of the small intestine or even the colon. Thus, if the drug is of such nature that it causes irritation in the stomach, duodenum or jejunum, and/or causes undesirable side effects, for example, abdominal pains, emesis, etc., the measures described heretofore are completely ineffective. Furthermore, the measures described heretofore are ineffective also where the nature of the ailment to be treated is such that the medicament must be liberated only in the ileum or colon where its action is to be exerted.

The reasons why the active drug is released before it reaches the ileum when the procedures of the prior art are utilized, will be readily apparent to persons skilled in the art. The lacquer coating, while resistant to acidic gastric juices, dissolves as soon as the content of the intestine becomes alkaline. On the other hand, a fat or wax coating is digested when it comes into contact with the enzymes of the duodenum.

It will be appreciated that many others factors, including physiological differences which are encountered in the gastro-intestinal tracts of particular patients, have a distinct bearing on the efficacy of coatings for drugs. For example, it is not uncommon that, due to a decrease in acid secretion or a reverse flow of the alkaline duodenal juice, the gastric juices become only slightly acid to neutral in reaction or even alkaline. Since those lacquer films which are normally resistant to gastric juices, start to swell and dissolve at a pH of about 4 or higher, there is a distinct possibility that, because of the physiological conditions mentioned hertofore, a lacquer coated medicament will be released while still in the stomach. On the other hand, it is well known that fat and wax coatings are more durable than lacquer coatings since they are, to a great extent, not influenced by the pH of the system. However, such coatings are not completely satisfactory since, frequently, they are damaged by the peristalsis of the stomach causing them to release their contents. This is especially true in those cases in which the fat or wax that is used contains components which melt, in whole or in part, at a temperature of up to about 37° C. Finally, it is well known that, from a technical standpoint, the application of fat or wax coatings to pharmaceutical compounds, leaves much to be desired. Even under the most favorable conditions, it is difficult to obtain a completely satisfactory product.

BRIEF SUMMARY OF THE INVENTION

The present invention is concerned with novel pharmaceutical compositions. The compositions are characterized in that the active medicament therein is released in the lower sections of the small intestine and in the colon, rather than in the stomach or upper sections of the small intestine.

The compositions comprise (1) a nucleus, i.e., a tablet, granulate, granule, gelatine capsule, etc. which contains the active drug component and conventional pharmaceutical adjuvants, coated, in the following sequence, with (2) a layer of an acid-soluble coating material which is resistant both to alkalis and intestinal juices, (3) a water-soluble intermediate layer, and (4) a layer of alkali-soluble coating material which is resistant to acid and gastric juices.

DETAILED DESCRIPTION

The present invention provides pharmaceutical compositions which are characterized in that the active medicament therein is released in the lower sections of the small intestine and the colon, rather than in the stomach or the upper sections of the small intestine.

In one of its more specific embodiments, the invention provides compositions which are useful in the oral treatment of intestinal infections, i.e. amoebiasis and schistosomiasis; and is provides a method of treating such infections using the compositions.

Polyelectrolytes which have carboxyl groups in their structure are representative of lacquer substances which are resistant to gastric juices. Additionally, such polyelectrolytes are insoluble in acid and non-resistant to intestinal juices. On the other hand, the polyelectrolytes having a number of basic amino groups are exemplary of lacquer substances which are acid-soluble, nonresistant to gastric juices and, more significantly, resistant to intestinal juices. It has been found that by using such lacquer substances, in proper sequence, one can obtain a coated pharmaceutical composition in which the release of the active drug or medicament is effectively controlled or regulated.

Thus, the pharmaceutical compositions of the present invention are characterized in that they comprise (1) a nucleus, i.e., tablet, granulate, granule, gelatine capsule, etc., containing the active drug and conventional pharmaceutical adjuvants, coated, in the following order with (2) a layer of an acid-soluble coating material which is resistant both to alkalis and intestinal juices, (3) a water-soluble intermediate layer of a type to be described hereinafter, and (4) a layer of an alakali-soluble coating material which is resistant to acid and to gastric juices. The first layer, that is, the acid-soluble lacquer which is resistant to alkalis and to intestinal juices can be applied, if desired, directly to the nucleus. In the alternative, the nucleus can be coated first with a hydrophilic or insulating layer consisting of, for example, sugar syrups, with or without mucilages, or solutions of solid polyethyleneglycols and, thereafter, with the acid-soluble lacquer. After the application of the acid-soluble lacquer layer has been completed, the coated nucleus is coated with an additional insulating intermediate layer of the type described heretofore. Subsequently, there is applied to the nucleus, so coated, a solution of a substance which is resistant to gastric juices. If desired, there can be applied to the coated product, thus obtained, an external sealing layer comprising a solution containing the previously mentioned hydrophilic substances. Optionally, coloring materials can be incorporated into the product as an adjuvant in such layer. Finally, the coated compositions can be provided with a commercially attractive appearance by means of conventional glazing and polishing methods and techniques.

To provide the coating which is resistant to intestinal juices, there is used in the practice of this invention, a film-forming, basic amino group-containing polyelectrolyte. Exemplary of such materials are amino group-containing polyacrylates or polymethacrylates, such as polymers or mixtures of polymers of aminoalkyl esters of acrylic acid or methacrylic acid; e.g., the dimethylaminoethyl ester of acrylic acid or methacrylic acid; amino group-containing polysaccharides, especially cellulose derivatives, such as benzylaminomethyl cellulose, acetyl cellulose-p-aminobenzoate, cellulose acetate diethyl aminoacetate; furthermore, sugar derivatives, such as sucrose aminobenzoate, mannitol - p - aminobenzoate; dodecylamine-N-lactoside; polyvinyl derivatives with basic groups, such as pyridine, piperidine or tert. amino groups, as well as mixtures of such polymers, such as polyvinyl, pyridine, polyvinyl piperidyl acetacetal, copolymers of vinyl pyridine and styrene, and vinyldiethylamine-vinyl acetate copolymers.

In the practice of this invention, there may be used, to provide the coating resistant to gastric juices, a film-forming, carboxyl group-containing polyelectrolyte. Exemplary of such materials are natural lacquers, such as keratin, shellac; carboxyl group-containing cellulose esters, such as cellulose acetate phthalate, acetyl-succinyl cellulose; carboxyl group-containing copolymers containing maleic acid as acidic component, such as copolymers of styrene and maleic anhydride, copolymers of the butyl partial ester of maleic acid with styrene and small quantities of acrylic acid, copolymers of maleic anhydride and vinyl methyl ether; carboxyl group-containing copolymers with acrylic acid or methacrylic acid as acidic component, such as copolymers of styrene and methacrylic acid.

The manner in which the coating compositions of this invention are applied to conventional oral dosage forms of medicinals will be readily apparent to persons skilled in the art. In general, the coating operation is carried out using conventional methods and techniques employing ordinary equipment. In the usual instance, film-forming materials, that is, the lacquers which are resistant to gastric juices and those resistant to intestinal juices, are formed into a solution in some medicinally acceptable solvent. The film-forming materials are, thereafter, applied to the pharmaceutical product while embodied in such solvent. In forming the desired solution, one can employ any suitable pharmaceutically acceptable solvent in which the film-forming substance in use is soluble. However, in the preferred embodiment of the invention, where cellulose acetate N,N-diethyl aminoacetate and cellulose acetate phthalate are employed as the coating materials, methylene chloride, generally admixed with a relatively small quantity of a low molecular weight, aliphatic alcohol, is used as the solvent. The concentration of the solution employed is variable within rather wide ranges. Completely satisfactory results will be obtained when the solution used contains from about 7 to 12 parts by weight of solvent for each part by weight of the film-forming material.

The actual coating operation is conventional. The uncoated pharmaceutical composition in, for example, tablet form, is placed in a rotatable coating pan with the solution containing the intestinal juice-resistant coating substance. The pan is rotated to provide the tablets with thin, uniform coat. The coated tablets are, subsequently, dried and the operation is repeated until the deposition of a thin layer of the coating substance on each tablet is assured. Thereafter, the insulating layer of hydrophilic substance is applied to the tablets by the same technique, following which the tablets are rotated in the coating pan in a solution containing the gastric juice-resistant substance. Finally, the external sealing coat is applied by usual methods.

The manner in which the coating compositions of this invention function to provide the desired release of the active mediament will be readily apparent to persons skilled in the art. Briefly, the coated pharmaceutical composition passes into the stomach where it is subjected to the action of the normally acid gastric juices. The external hydrophilic layer, if present, dissolves. However, the coating layer which is provided by the lacquer that is resistant to the stomach juices, is not dissolved therein. Accordingly, the composition remains intact so long as it is maintained in the acid environment. When, however, the medium becomes only weakly acid or neutral or slightly alkaline, as will happen as the composition passes along the gastrointestinal tract, the acid resistant layer will swell and ultimately dissolve. Subsequently the intermediate insulating layer, comprising the hydrophilic materials named heretofore, becomes dissolved. The next layer, that is, the layer provided by the lacquer which is acid-soluble and resistant to intestinal juices, remains intact since, after passing from the stomach into the gastrointestinal tract, the system is no longer acid. The layer, accordingly, does not dissolve and the preparation does not disintegrate. It has been found, however, that, under such circumstances, an active dry or medicament, if it is a water-soluble material, is released from the composition at a relatively slow rate. This is occasioned by the fact that the layers which coat the drug are not completely impermeable. Rather, the layers are porous and, to some extent, may be considered as enveloping the drug in a semipermeable membrane. According to particular needs and requirements, the porosity of the layers can be increased or decreased to regulate the release of the drug. For example, by the use of solid materials, such as, talc, pigments, calcium and magnesium stearate, etc., in the coating composition, the porosity of the coating layers can be reduced. The use of larger quantities of lacquer solution does not eliminate the porosity. However, by varying the amounts of coating solutions employed one can change the size of the pores so that the rate at which the drug is diffused from the product can be regulated.

The coatings which are provided by the practice of the present invention are such that, even when the gastric juices are weakly acid or neutral or when the stomach contents are alkaline, the active drug or medicament is protected from premature release. Under such circumstances the external layer, that is, the layer provided by the lacquer which is resistant to gastric juices but not resistant to alkali, is dissolved. The stomach liquids, after the intermediate insulating layer has been dissolved, reach the layer which is formed by the lacquer which is resistant to intestinal juices and alkali. Such layer is not, however, dissolved or disintegrated. The diffusion of the active drug or medicament, mentioned heretofore, does, however, begin at this point. By appropriate means, for example, by suitable alteration of the coating formulation and/or the quantity of the lacquer solution applied, one can regulate the rate at which the active drug or medicament is diffused from the composition. By this means, provision is made so that the active drug ingredient will for the most part be released only after it has reached the ileum.

It has been found also that the diffusion of the active drug component of the composition, through the alkali-resistant lacquer layer, can be regulated by incorporating into the nucleus, which is to be coated, water-insoluble and/or alkali-insoluble materials as well as slowly digestible or even non-digestible inert substances, such as barium sulphate, tricalcium phosphate, calcium carbonate, high-melting waxes, zein, hydrogenated castor oil, etc.

It will be immediately apparent that the present invention is not restricted to compositions coated only one time with an alkali-soluble lacquer and one time with an acid-soluble lacquer. By means of the use of an intermediate hydrophilic insulating layer, of the type described heretofore, between successive lacquer layers it is possible to apply to the medicament-containing nucleus multiple layers of either or both type lacquers. For example, to the nucleus there may be applied first a lacquer which is resistant to intestinal juices followed, in sequence, by an intermediate hydrophilic layer; a second coat of the lacquer resistant to intestinal juices; an additional intermediate hydrophilic layer; then a lacquer which is resistant to gastric juices followed by an external sealing layer. On the other hand, there can be applied to the nucleus, a lacquer which is resistant to intestinal juices, followed, in succession, by an intermediate layer of hydrophilic substance; a coat of lacquer which is resistant to gastric juices; an intermediate layer of a hydrophilic substance, a second coat of a lacquer which is resistant to gastric juices followed by the external sealer coat. Furthermore, there can be applied to the nucleus two layers of a lacquer which is resistant to intestinal juices, such layers being separated by an intermediate layer of a hydrophilic substance; a second intermediate hydrophilic insulating layer; followed by two layers of a lacquer which is resistant to gastric juices, such layers of lacquer being separated by an intermediate hydrophilic insulating layer; followed by the external sealer coat. The foregoing is included herein merely for the purpose of illustration it having been established that up to three layers of lacquer which is resistant to gastric juices and/or up to three layers of a lacquer which is resistant to intestinal juices can be applied. Additionally, there may be distributed throughout the insulating layers, if desired, portions of the same drug or medicament which is present in the nucleus. On the other hand, there may be incorporated into the intermediate hydrophilic layers one or more drugs or medicaments which are different from that present in the nucleus.

Insofar as the drug or medicament is concerned, the present invention has wide applicability. In general, a pharmaceutical preparation containing any drug, or combination of drugs, can be coated in the manner described herein. The invention is, however, particularly well suited for use in the coating of tablets, dragées, etc., containing emetine or dehydroemetine as the active ingredient. Compositions containing emetine and dehydroemetine are used for, and useful in, the treatment of two intestinal infections, namely amoebiasis and schistosomiasis. Prior to the present invention, the outstanding activity of these compounds was, in part, negated by the fact that their oral tolerance was extremely poor. Even when these compounds were formulated into preparations which were resistant to gastric juices, their administration, in very many instances, resulted in the undesirable side effects of nausea, vomiting, abdominal pains and diarrhea. It has been found that these sides effects can be eliminated, or at the very least substantially reduced, when preparations containing emetine or dehydroemetine are coated in a manner described herein.

In the treatment of intestinal infections, such as, amoebiasis and schistosomiasis, the effective dosages will be determined by the severity of the infection and the needs and requirements of the patient, as diagnosed by the attending physician. It has been found, however, that, as a general rule, an oral dosage of from about 25 mg. to about 100 mg. of emetine or dehydroemetine per day, administered over a period of from about ten to twenty days will suffice to overcome the infection. The tablets used may contain, for example, 10 mg., 25 mg., 50 mg., or 100 mg. of active substance. In a preferred method of treating amoebiasis, tablets, prepared as described herein, are administered orally to provide 50 mg. of emetine or dehydroemetine per day for a period of ten days. In a preferred method of treating schistosomiasis, tablets, prepared as described herein, are administered orally to provide 100 mg. of emetine or dehydroemetine per day for a period of twenty days. Emetine and dehydroemetine can be used in their complexes with bismuth iodide.

Further examples of substances which can be used as the medicament in the practice of the present invention are: antimony potassium tartrate, acetylsalicylic acid, sodium or calcium acetylsalicylate, sodium salicylate, p-aminosalicylic acid or sodium or calcium p-aminosalicylate.

For a fuller understanding of the nature and objects of this invention, reference may be had to the following examples which are given merely as a further illustration of the invention and are not to be construed in a limiting sense. All parts given in the examples are parts by weight, unless indicated to the contrary.

Example 1

In this example, 1,000 coated tablets containing emetine hydrochloride as the active ingredient were prepared.

The preparative method involved the first step of mixing 70.0 grams of lactose with 25.0 grams of emetine hydrochloride. This mixture was moistened and granulated with a paste consisting of 2.5 grams of swollen maize starch and 17.5 grams of water. Thereafter, there was added to and mixed in, such granulate, 0.5 gram of magnesium stearate and 2 grams of talc. Thereafter, the granulate was pressed into 1,000 biconvex nuclei having a diameter of 7 mm.

Subsequently, there was prepared a solution containing 2.0 parts of cellulose acetate N,N-diethyl aminoacetate, 1.0 part of methyl alcohol and 17 parts of methylene chloride. This solution was charged into a conventional rotatable tablet-coating pan containing the tablet nuclei described in the immediately preceding paragraph. A filmcoat was applied to the nuclei by rotating the coating pan. Subsequently, the nuclei were dried. Thereafter, the coating and drying operation was repeated fourteen times. The nuclei which were thus obtained, had been provided with a coating which was resistant both to alkali and intestinal juices. These nuclei were dried for a period of about 12 hours at a temperature of about 40° C.

Thereafter, there was prepared a syrup containing 15.0 parts of white gelatin, 291 parts of water (564 parts of sugar and 130 parts of gum arabic mucilage. This syrup was introduced into the rotatable tablet coating pan containing the coated nuclei, described in the preceding paragraph. The nuclei were coated with the syrup, in the rotating pan, until the total weight thereof, after drying, was 130 grams. The tablets were then held, for a period of about 12 hours, at a temperature of about 40° C.

Subsequently, a lacquer solution containing 1.5 parts of cellulose acetate phthalate, 0.75 part of methyl alcohol and 12.75 parts of methylene chloride was prepared. This solution was applied to the coated nuclei, obtained as described in the preceding paragraphs, in fifteen separate applications, the nuclei being dried in between each application. Such application was carried out using the rotating tablet coating pan. Subsequently, the thus coated nuclei were dried for a period of about 12 hours at a temperature of about 40° C.

At the end of the drying period, there was applied to the coated nuclei, a coating comprising 15.0 parts of white gelatin, 291 parts of water, 564 parts of sugar and 130 parts of gum arabic mucilage until a total weight of 170 grams was reached. Thereafter, an additional layer was applied to the nuclei using the same gelatin-sugar syrup, described heretofore, which contained also a coloring material. Such sugar solution was applied in the rotating tablet coating pan, until the total weight of the tablets was 200 grams. The coated preparations, thus obtained, were polished by continuously rotating same in a coating pan containing beeswax.

The coating compositions, produced as described in the preceding paragraphs, were tested to ascertain the manner in which and the rate at which the active drug component was released therefrom. In the test method employed, the coated compositions were subjected, for a period of about one hour, in a tablet disintegration tester such as is described in U.S. Pharmacopeia XVI, page 934, to an artificial gastric juice (pH 1.3) at a temperature of 37° C. At the end of that period of time, approximately one-half of the volume of the artificial gastric juice was removed and replaced by the same volume of artificial intestinal juice having a pH of 7.5. The artificial gastric juice which was recovered in this step was analyzed to ascertain whether emetine had separated from the composition by diffusion.

The compositions were then subjected, for a period of about one hour, to the thus obtained mixture of artificial gastric juice and artificial intestinal juice (pH 3.5) at a temperature of about 37° C. At the end of the one hour period, one-half of the volume of the artificial digestive juice was removed and analyzed for emetine. The removed portion of the digestion juice was replaced with the same volume of artificial intestinal juice. The compositions were moved about in this juice for a period of about one hour, following which one-half of the volume of the digestion juice (pH 6.3) was removed and replaced with the same volume of artificial intestinal juice. The compositions were agitated in this juice for an additional one hour period, following which one-half of the volume of the artificial juice (pH 7.0) was removed and replaced by the same volume of artificial intestinal juice. The compositions were subsequently moved about, for additional one hour periods of time, in the digestion juice, one-half of the juice being removed and replaced by the same volume of artificial intestinal juice after each one hour period until the pH value of the juice has reached 7.5.

The table which follows hereinafter depicts the rate at which the drug component, that is, emetine, was released, in vitro, from the composition.

| Hours | Released emetine, percent (content of medicament in the dragée=100%) |
|---|---|
| 3 | 17 |
| 4 | 24 |
| 5 | 34 |
| 6 | 45 |
| 7 | 54 |
| 8 | 61 |
| 9 | 74 |

The foregoing demonstrates that the release of emetine from the coated composition commenced only after an elapsed time of about two hours and that, subsequently, the release of the active drug from the coated tablet increased, linearly, at a rate of about 10 percent per hour.

Example 2

In this example, coated compositions were prepared in the manner described in Example 1 using, with but one exception, the same ingredients and the same quantities thereof as were used in Example 1. In producing the product of this example, dehydroemetine dihydrochloride was used as the drug component rather than emetine hydrochloride.

The release characteristics of the product of this Example were comparable to those of the product of Example 1.

The 25 mg. dehydroemetine dihydrochloride tablets, produced as described in this example, were used in the treatment of fifty-eight patients suffering with colonic states of amoebic nature with diarrhea and dysentery. Each patient was treated with 50 mg. of dehydroemetine dihydrochloride per day administered orally in the form of two 25 mg. tablets. The treatment was carried out over a period of ten days, each patient having received during such period a total of 500 mg. of dehydroemetine dihydrochloride.

In all instances, clinical improvement was rapidly achieved and intestinal function reverted to normal on the fourth and fifth day. The lesions observed on sigmadoscopy showed improvement beginning on the third day of treatment. This improvement was considered to be a most important criterium in evaluating the efficacy of the drug when administered orally. The disappearance of hystolitic amoebae was confirmed at the end of the period of treatment.

It was observed throughout the study that the tablets were very well tolerated by the patients and that the treatment therewith was not associated with any physiological modifications or signs of intoxication. It was concluded from the foregoing that the coated tablets of this example, in addition to being effective in the treatment of amoebic infections, were safe for use when administered orally.

I claim:

1. A pharmaceutical composition, in unit dosage form for oral administration, comprising a medicament-containing nucleus, said nucleus being coated, in sequence, with (1) a coating of a basic amino group-containing polyelectrolyte selected from the group consisting of a polymer of an aminoalkyl ester of acrylic acid, a polymer of an aminoalkyl ester of methacrylic acid, a mixture of a polymer of an aminoalkyl ester of acrylic acid and a polymer of an aminoalkyl ester of methacrylic acid benzylaminomethyl cellulose, acetyl cellulose-p-aminobenzoate, cellulose acetate diethyl aminoacetate, sucrose aminobenzoate, mannitol-p-aminobenzoate, dodecylamine-N-lactoside, polyvinyl pyridine, polyvinyl piperidine, polyvinyl piperidyl acetacetal, a copolymer of vinyl pyridine and styrene and a copolymer of vinyldiethylamine and vinyl acetate, (2) a coating of a hydrophilic substance selected from the group consisting of gelatin, sugar syrup and polyethylene glycol, (3) a coating of a carboxyl group-containing polyelectrolyte selected from the group consisting of a natural lacquer, cellulose acetate phthalate, acetyl-succinyl cellulose, a copolymer of styrene and maleic anhydride, a copolymer of butyl partial ester of maleic acid with styrene and acrylic acid, a copolymer of maleic anhydride and vinyl methyl ether, a copolymer of styrene and acrylic acid and a copolymer of styrene and methacrylic acid.

2. The composition of claim 1 wherein the medicament is emetine hydrochloride.

3. The composition of claim 1 wherein the medicament is dehydroemetine dihydrochloride.

4. The composition of claim 1 wherein coating ingredient (1) is cellulose acetate N,N-diethyl aminoacetate.

5. The composition of claim 1 wherein coating ingredient (2) is a gelatin-sugar syrup.

6. The composition of claim 1 wherein coating ingredient (3) is cellulose acetate phthalate.

7. A method for achieving the release of an orally administered medicament in the lower sections of the small intestine and colon which comprises administering the medicament in a dosage form comprising a medicament-containing nucleus, said nucleus being coated, in sequence, with (1) a coating of a basic amino group-containing polyelectrolyte selected from the group consisting of a polymer of an aminoalkyl ester of acrylic acid, a polymer of an aminoalkyl ester of methacrylic acid, a mixture of a polymer of an aminoalkyl ester of acrylic acid and a polymer of an aminoalkyl ester of methacrylic acid, benzylaminomethyl cellulose, acetyl cellulose-p-aminobenzoate, cellulose, acetate diethyl aminoacetate, sucrose aminobenzoate, mannitol-p-aminobenzoate, dodecylamine-N-lactoside, polyvinyl pyridine, polyvinyl piperidine, polyvinyl piperidyl acetacetal, a copolymer of vinyl pyridine and styrene and a copolymer of vinyldiethylamine and vinyl acetate, (2) a coating of a hydrophilic substance selected from the group consisting of gelatin, sugar syrup and polyethylene glycol, (3) a coating of carboxyl group-containing polyelectrolyte selected from the group consisting of a natural lacquer, cellulose acetate phthalate, acetyl-succinyl cellulose, a copolymer of styrene and maleic anhydride, a copolymer of butyl partial ester of maleic acid with styrene and acrylic acid, a copolymer of maleic anhydride and vinyl methyl ether, a copolymer of styrene and acrylic acid and a copolymer of styrene and methacrylic acid.

8. The method of claim 7 wherein the medicament employed is emetine hydrochloride.

9. The method of claim 7 wherein the medicament employed is dehydroemetine dihydrochloride.

10. A process for treating an intestinal infection orally which comprises administering to the infected host a therapeutically effective amount of a medicament selected from the group consisting of emetine, dehydroemetine and a salt thereof, said medicament being administered in a dosage form comprising a medicament-containing nucleus, said nucleus being coated, in sequence, with (1) a coating of a basic amino group-containing polyelectrolyte selected from the group consisting of a polymer of an aminoalkyl ester of acrylic acid, a polymer of an aminoalkyl ester of methacrylic acid, a mixture of a polymer of an aminoalkyl ester of acrylic acid and a polymer of an aminoalkyl ester of methacrylic acid, benzylaminomethyl cellulose, acetyl cellulose-p-aminobenzoate, cellulose acetate diethyl aminoacetate, sucrose aminobenzoate, mannitol-p-aminobenzoate, dodecylamine-N-lactoside, polyvinyl pyridine, polyvinyl piperidine, polyvinyl piperidyl acetacetal, a copolymer of vinyl pyridine and styrene and a copolymer of vinyldiethylamine and vinyl acetate, (2) a coating of a hydrophilic substance selected from the group consisting of gelatin, sugar syrup and polyethylene glycol, and (3) a coating of a carboxyl group-containing polyelectrolyte selected from the group consisting of a natural lacquer, cellulose acetate phthalate, acetyl-succinyl cellulose, a copolymer of styrene and maleic anhydride, a copolymer of butyl partial ester of maleic acid with styrene and acrylic acid, a copolymer of maleic anhydride and vinyl methyl ether, a copolymer of styrene and acrylic acid and a copolymer of styrene and methacrylic acid.

11. The process of claim 10 wherein a dosage form containing emetine hydrochloride is employed.

12. The process of claim 10 wherein a dosage form containing dehydroemetine dihydrochloride is employed.

References Cited

UNITED STATES PATENTS 2,957,804  10/1960  Shuyler _____ 167—82 XV

LEWIS GOTTS, *Primary Examiner.*

S. K. ROSE, *Assistant Examiner.*

U.S. Cl. X.R.

260—288